(12) United States Patent
Song et al.

(10) Patent No.: US 11,591,026 B2
(45) Date of Patent: Feb. 28, 2023

(54) VEHICLE BODY JOINT STRUCTURE

(71) Applicants: Hyundai Motor Company, Seoul (KR); Kia Corporation, Seoul (KR)

(72) Inventors: Won Ki Song, Seongnam-si (KR); YongHa Han, Yongin-si (KR); Youn Sic Nam, Daejeon (KR); Ui-Jin Jung, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/443,489

(22) Filed: Jul. 27, 2021

(65) Prior Publication Data

US 2022/0194482 A1 Jun. 23, 2022

(30) Foreign Application Priority Data

Dec. 17, 2020 (KR) .......... 10-2020-0177101

(51) Int. Cl.
*B62D 24/00* (2006.01)
*B62D 24/02* (2006.01)
*B62D 27/02* (2006.01)
*B60R 19/34* (2006.01)
*B62D 25/02* (2006.01)
*B62D 27/06* (2006.01)
*B60R 19/03* (2006.01)

(52) U.S. Cl.
CPC .............. *B62D 24/00* (2013.01); *B60R 19/03* (2013.01); *B60R 19/34* (2013.01); *B62D 24/02* (2013.01); *B62D 25/025* (2013.01); *B62D 27/023* (2013.01); *B62D 27/065* (2013.01)

(58) Field of Classification Search
CPC ....... B62D 24/00; B62D 24/02; B62D 27/023
USPC ................................. 296/35.1, 35.3
See application file for complete search history.

(56) References Cited

U.S. PATENT DOCUMENTS

| | | | | |
|---|---|---|---|---|
| 2,303,286 | A * | 11/1942 | Lake ...................... | B62D 31/00 296/35.3 |
| 3,881,767 | A * | 5/1975 | Klees .................... | B60G 99/004 293/30 |
| 4,046,415 | A * | 9/1977 | Klees .................... | B62D 27/04 296/35.1 |
| 11,052,845 | B2 * | 7/2021 | Steinebach ............. | B60R 19/03 |

FOREIGN PATENT DOCUMENTS

| | | | | |
|---|---|---|---|---|
| EP | 1415896 | A2 * | 5/2004 | ........... B62D 25/087 |
| JP | 2009057031 | A * | 3/2009 | ............. B62D 21/02 |

* cited by examiner

*Primary Examiner* — Dennis H Pedder
(74) *Attorney, Agent, or Firm* — Slater Matsil, LLP

(57) ABSTRACT

An embodiment vehicle body coupling structure of a vehicle that includes an underbody and an upper body coupled to the underbody includes a front back beam assembly provided on a front side of the underbody, a first mounting part provided on a front side member of the upper body and coupled with the front back beam assembly, and a first body coupling part provided on the front back beam assembly and engaged with the first mounting part.

20 Claims, 9 Drawing Sheets

VEHICLE BODY JOINT STRUCTURE

CROSS-REFERENCE TO RELATED APPLICATIONS

This application claims the benefit of Korean Patent Application No. 10-2020-0177101, filed on Dec. 17, 2020, which application is hereby incorporated herein by reference.

TECHNICAL FIELD

An embodiment of the present invention relates to a vehicle body coupling structure.

BACKGROUND

Recently, the vehicle industry has introduced a new concept of future mobility visions for realizing a human-centered dynamic future city. One of these future mobility solutions is a purpose-built vehicle (PBV) as a purpose-based mobility unit.

The PBV is an environment-friendly mobility solution that provides customized services necessary for occupants during the time of moving to a destination on a ground, and it may also perform setting of an optimal path and cluster driving for each situation using electric vehicle-based and artificial intelligence.

For example, the PBV is capable of setting an optimal path and cluster driving for each situation, and may further be a box-type design vehicle with a large indoor space.

The vehicle body of such a PBV is composed of an underbody (also referred to as a rolling chassis or a skateboard in the industry) and an upper body mounted on the underbody. Here, the battery module is mounted on the underbody. In addition, the upper body may be a space frame formed by welding a steel plate or a pipe to form a skeleton.

However, such a PBV has a problem that, as the front vehicle body is designed in the box shape, the front frame strength is weak and the impact absorption performance in cases of a front collision is weak.

The above information disclosed in this Background section is only for enhancement of understanding of the background of the invention, and therefore it may contain information that does not form the prior art that is already known to a person of ordinary skill in the art.

SUMMARY

An embodiment of the present invention relates to a vehicle body coupling structure. More particularly, embodiments of the present invention relate to a vehicle body coupling structure of a purpose built vehicle (PBV).

An embodiment of the present invention provides a vehicle body coupling structure that increases a joint strength of the underbody and the upper body, and secures front collision stability of the vehicle body.

A vehicle body coupling structure of a vehicle including an underbody and an upper body coupled to the underbody according to an embodiment of the present invention includes a front back beam assembly provided on the front side of the underbody, a first mounting part provided on a front side member of the upper body and coupled with the front back beam assembly, and a first body coupling part provided on the front back beam assembly and engaged with the first mounting part.

In the vehicle body coupling structure according to an embodiment of the present invention, the front back beam assembly may include a front back beam and a front crash box having a first body coupling part and connected to the front back beam.

In the vehicle body coupling structure according to an embodiment of the present invention, the front back beam and the front crash box may be formed of an aluminum material.

In the vehicle body coupling structure according to an embodiment of the present invention, the first mounting part may include a first mounting bracket coupled to the front part of the front side member, a first bolt guide coupled to the first mounting bracket, and a first mounting bolt coupled to the first bolt guide.

In the vehicle body coupling structure according to an embodiment of the present invention, the first body coupling part may include a mounting nut engaged with the first mounting bolt inserted into the inside of the front crash box through the upper surface.

In the vehicle body coupling structure according to an embodiment of the present invention, the mounting nut may be engaged with the first mounting bolt through a mount hole provided on the lower surface of the front crash box.

Also, the vehicle body coupling structure according to an embodiment of the present invention may further include a front chassis frame connected to the rear of the front back beam assembly, a second mounting part provided on the center part of the front side member and coupled with the front part of the front chassis frame, and a second body coupling part provided on the front part of the front chassis frame and engaged with the second mounting part.

In the vehicle body coupling structure according to an embodiment of the present invention, the second body coupling part may form greater joint strength than the joint strength of the first body coupling part.

In the vehicle body coupling structure according to an embodiment of the present invention, the second mounting part may include a second mounting bracket coupled to the center part of the front side member, a second bolt guide coupled to the second mounting bracket, and a second mounting bolt coupled to the second bolt guide.

In the vehicle body coupling structure according to an embodiment of the present invention, the second body coupling part may include a third bolt guide of a pipe shape fixed within a closed cross-section of the front chassis frame and supporting the second mounting bolt inserted inside the front chassis frame through the upper surface and a weld nut that is fixed to the lower surface of the front chassis frame and engaged with the second mounting bolt penetrating the third bolt guide and the lower surface of the front chassis frame.

Also, the vehicle body coupling structure according to an embodiment of the present invention may further include a third mounting part provided on the rear part of the front side member and coupled to the center part of the front chassis frame and a third body coupling part provided on the center part of the front chassis frame and engaged with the third mounting part.

In the vehicle body coupling structure according to an embodiment of the present invention, the third mounting part may include a third mounting bracket coupled to the rear part of the front side member, a fourth bolt guide coupled to the third mounting bracket, and a third mounting bolt coupled to the fourth bolt guide.

In the vehicle body coupling structure according to an embodiment of the present invention, the third body coupling part may include a fixing bracket coupled to the outer surface of the front chassis frame and a mounting bush fixed to the fixing bracket and engaged with the third mounting bolt.

In the vehicle body coupling structure according to an embodiment of the present invention, an under crossmember coupled along the vehicle width direction may be provided on the center part of the front chassis frame.

In the vehicle body coupling structure according to an embodiment of the present invention, the under crossmember may include a lower part connected to the center part of the front chassis frame along a vehicle width direction and an upper part coupled with the upper surface of the front chassis frame and the lower part.

Also, the vehicle body coupling structure according to an embodiment of the present invention may further include a center chassis frame connected to the rear of the front chassis frame, a rear chassis frame connected to the rear of the center chassis frame, a fourth mounting part provided on the rear side member of the upper body and coupled with the rear chassis frame, and a fourth body coupling part provided on the rear chassis frame and engaged with the fourth mounting part.

In the vehicle body coupling structure according to an embodiment of the present invention, the front side member may be connected through the upper crossmember in a vehicle width direction, and the upper crossmember may be connected to both side sills of the upper body.

An embodiment of the present invention may increase the skeletal strength of the underbody and the upper body, and may improve the forward collision performance of the vehicle.

Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

The drawings are provided for reference in describing embodiments of the present invention, and the spirit of the present invention should not be construed only by the accompanying drawings.

Figure 1:
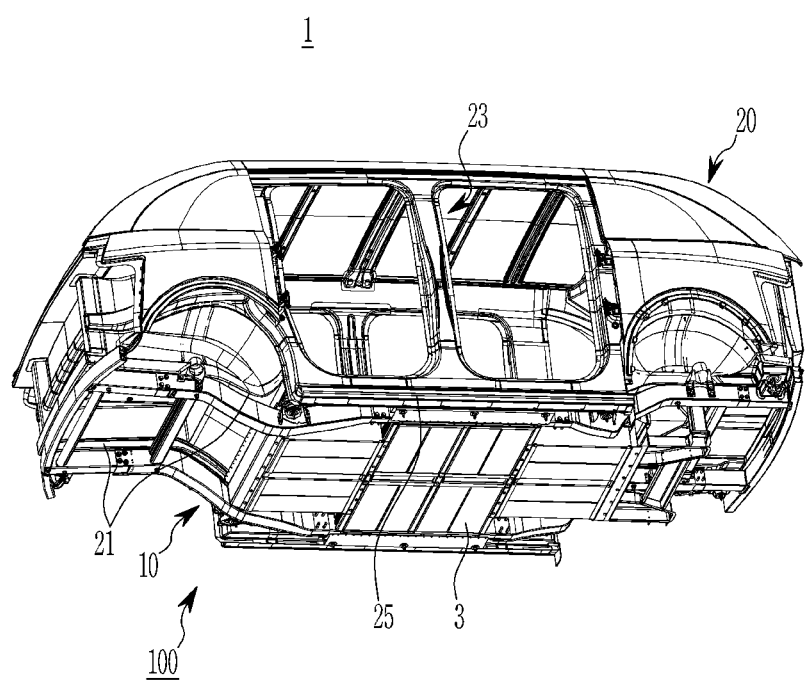
FIG. 1 is a view showing an example of a vehicle to which a vehicle body coupling structure according to an embodiment of the present invention may be applied.

The following elements may be used in connection with the drawings to describe embodiments of the present invention.

| | |
|---|---|
| 1: vehicle | 10: underbody |
| 11: front back beam assembly | 12: front back beam |
| 13: front chassis frame | 14: front crash box |
| 15: center chassis frame | 16a, 22: front part |
| 16b, 24: center part | 16c, 26: rear part |
| 16d: closed cross-section | 16e: outer surface |
| 17: rear chassis frame | 18: under crossmember |
| 19: rear back beam assembly | 19a: lower part |
| 19b: upper part | 20: upper body |
| 21: front side member | 23: side assembly |
| 25: side sill | 28: upper crossmember |
| 29: rear side member | 30: first mounting part |
| 31: first mounting bracket | 35: first bolt guide |
| 37: first mounting bolt | 40: first body coupling part |
| 41: mounting nut | 43: first bolt joint hole |
| 45: mount hole | 50: second mounting part |
| 51: second mounting bracket | 55: second bolt guide |
| 57: second mounting bolt | 60: second body coupling part |
| 61: third bolt guide | 63, 88: weld nut |
| 65: second bolt joint hole | 70: third mounting part |
| 71: third mounting bracket | 75: fourth bolt guide |
| 77: third mounting bolt | 80: third body coupling part |
| 81: fixing bracket | 83: mounting bush |
| 85: outer case | 87: inner pipe |
| 89: rubber bush | 90: fourth mounting part |
| 95: fourth body coupling part | 100: vehicle body coupling structure |

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Components unrelated to the description will be omitted in order to clearly describe embodiments of the present invention, and like reference numerals will be used to describe like components throughout the present specification.

The size and thickness of each configuration shown in the drawings are arbitrarily shown for better understanding and ease of description, but the present invention is not limited thereto, and the thickness of layers, films, panels, regions, etc., are exaggerated for clarity.

In the following detailed description, names of constituent elements which are in the same relationship are divided into "first", "second", and the like, but the present invention is not limited to the order in the following description.

In addition, unless explicitly described to the contrary, the word "comprise" and variations such as "comprises" or "comprising" will be understood to imply the inclusion of stated elements but not the exclusion of any other elements.

In addition, the terms " . . . unit", " . . . means", " . . . part", and " . . . member" described in the specification mean units of a general configuration performing at least one function or operation.

FIG. 1 is a view showing an example of a vehicle to which a vehicle body coupling structure according to an embodiment of the present invention may be applied.

Referring to FIG. 1, a vehicle body coupling structure 100 according to an embodiment of the present invention is applied to a purpose built vehicle (PBV) 1.

The PBV 1 is an environment-friendly mobility solution that provides customized services necessary for occupants during the time of moving to the destination on a ground. Furthermore, the PBV 1 may be a box-type design vehicle with a large interior space. The PBV 1 of the box-type design described above has a windshield glass (not shown in the drawing) at the frontmost part of the vehicle body.

This PBV 1 includes an underbody 10 (also referred to as a rolling chassis in the industry) of a skateboard type and an upper body 20 mounted on the underbody 10. Here, battery assemblies 3 are mounted on the underbody 10.

In the industry, a vehicle width direction is referred to as an L direction, a vehicle body length direction (a before and after direction of the vehicle body) is referred to as a T direction, and a height direction of the vehicle body is referred to as an H direction. However, in an embodiment of the present invention, instead of setting the LTH directions as described above as the reference directions, the constituent elements in the following are described by setting the vehicle width direction, the vehicle body length direction, and the height direction.

In addition, an end (one side end or the other side end) in the following may be defined as an end of any side and a certain portion (one side end or the other side end) including the end.

Figure 2:
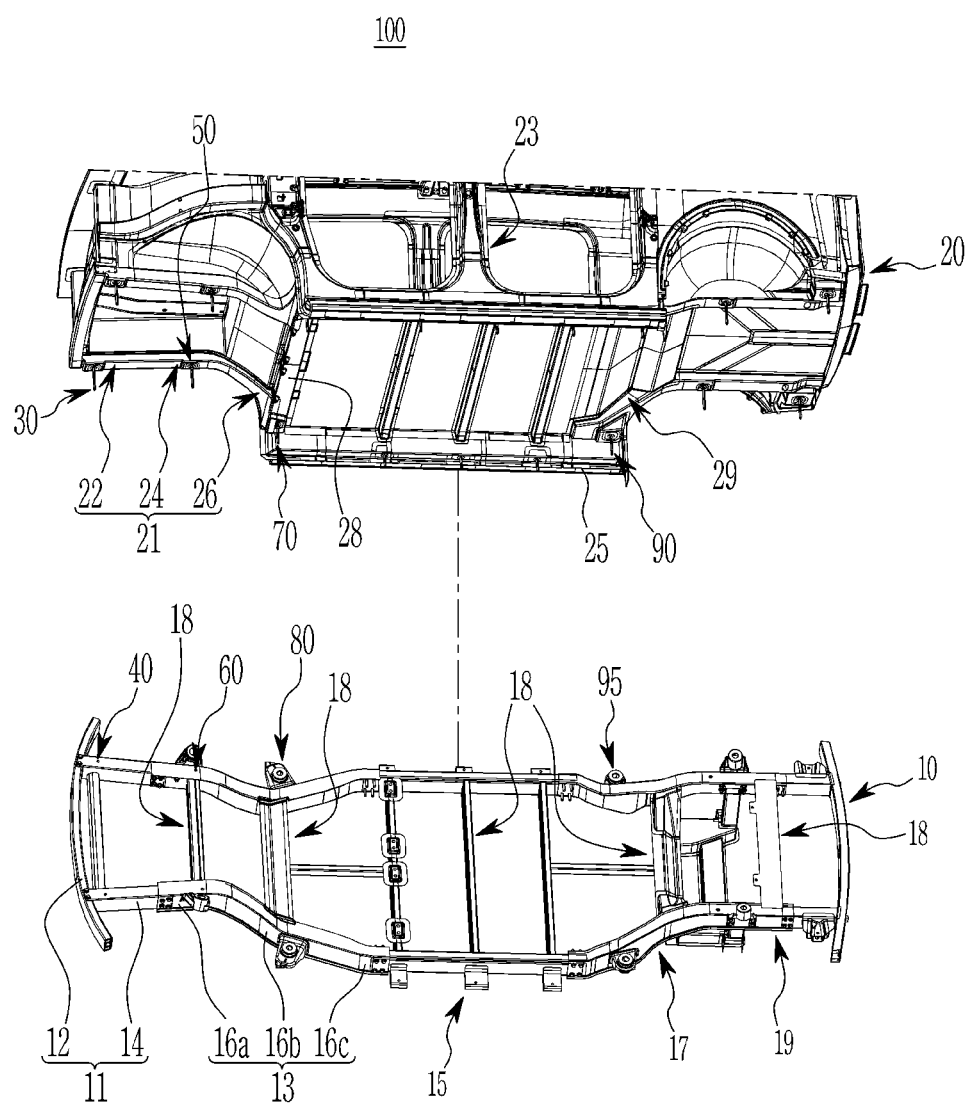
FIG. 2 is an exploded perspective view of an underbody and an upper body showing a vehicle body coupling structure according to an embodiment of the present invention.

FIG. 2 is an exploded perspective view of an underbody and an upper body showing a vehicle body coupling structure according to an embodiment of the present invention.

Referring to FIG. 1 and FIG. 2, the underbody 10 according to an embodiment of the present invention includes a front back beam assembly 11, a front chassis frame 13, a center chassis frame 15, a rear chassis frame 17, and a rear back beam assembly 19, which are connected to each other along a front and rear direction of the vehicle body.

The front back beam assembly 11 is provided on the front side of the underbody 10, and the front chassis frame 13 is connected to the rear side of the front back beam assembly 11. And, the center chassis frame 15 is connected to the rear side of the front chassis frame 13, the rear chassis frame 17 is connected to the rear side of the center chassis frame 15, and the rear back beam assembly 19 is connected to the rear side of the rear chassis frame 17.

In the above, the front back beam assembly 11 includes a front back beam 12 and a front crash box 14 connected to the rear side of the front back beam 12 and having a closed cross-section of a rectangular cross-section shape. Here, the front crash box 14 of the front back beam assembly 11 connects the front back beam 12 and the front chassis frame 13.

Also, the front chassis frame 13, the center chassis frame 15, and the rear chassis frame 17 are made of, for example, a steel material, and form the closed cross-section of the rectangular cross-section shape. In the above, the front chassis frame 13 includes a front part 16a, a center part 16b, and a rear part 16c that are integrally connected to each other along the front and rear direction of the vehicle body. The front part 16a is connected to the front crash box 14, and the rear part 16c is connected to the center chassis frame 15.

Furthermore, the front chassis frame 13, the center chassis frame 15, and the rear chassis frame 17 include an under crossmember 18 coupled along the vehicle width direction.

Meanwhile, the upper body 20 is a body that is coupled to the underbody 10, and constitutes a cabin in the center part between the front and rear parts, and for example, the upper body 20 may be a space frame formed by connecting steel plates or pipes to form a skeleton.

The upper body 20 includes a front side member 21 provided on both sides of the front part, and a side assembly 23 connected to the front side member 21 along the front and rear direction of the vehicle body. The front side member 21 and the side assembly 23 are coupled with the underbody 10 as above.

In the above, the front side member 21 includes the front part 22, the center part 24, and the rear part 26, which are integrally connected to each other along the front and rear directions of the vehicle body. In addition, the rear part 26 of the front side member 21 is connected in the vehicle width direction through the upper crossmember 28.

In addition, in the above, the side assembly 23 has a side sill 25 formed at the lower end. This side sill 25 is connected to the upper crossmember 28 mentioned above.

Furthermore, the upper body 20 as described above includes rear side members 29 provided on both sides of the rear portion.

The vehicle body coupling structure 100 according to an embodiment of the present invention applied to the PBV 1 as described above is formed of the structure capable of increasing the joint strength of the underbody 10 and the upper body 20 and increasing absorption performance of the collision load due to the forward collision of the vehicle body.

To this end, the vehicle body coupling structure 100 according to an embodiment of the present invention basically includes a first mounting part 30 and a first body coupling part 40.

In an embodiment of the present invention, the first mounting part 30 is coupled with the front back beam assembly 11 of the underbody 10, and is provided on the front part 22 of the front side member 21 in the upper body 20.

Also, in an embodiment of the present invention, the first body coupling part 40 is engaged with the first mounting part 30, and is provided in the front crash box 14 of the front back beam assembly 11.

Specific configurations of the first mounting part 30 and the first body coupling part 40 are described in detail below.

Figure 3:
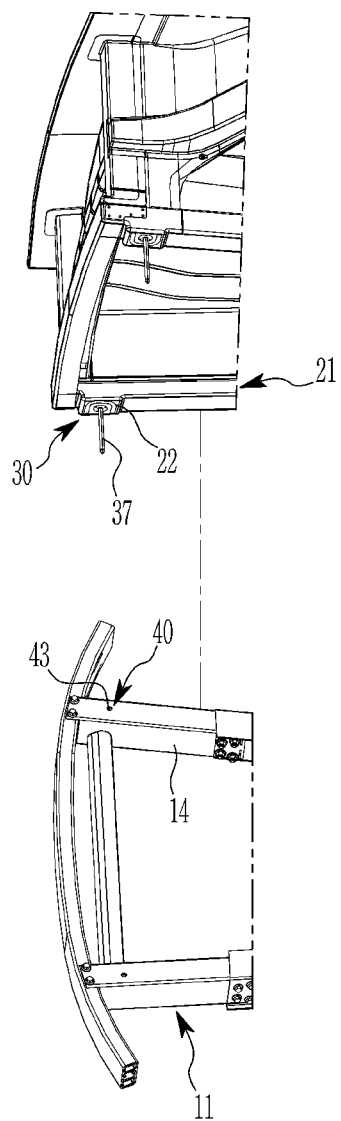
FIG. 3 is an exploded perspective view showing a first mounting part and a first body coupling part applied to a vehicle body coupling structure according to an embodiment of the present invention.
Figure 4:
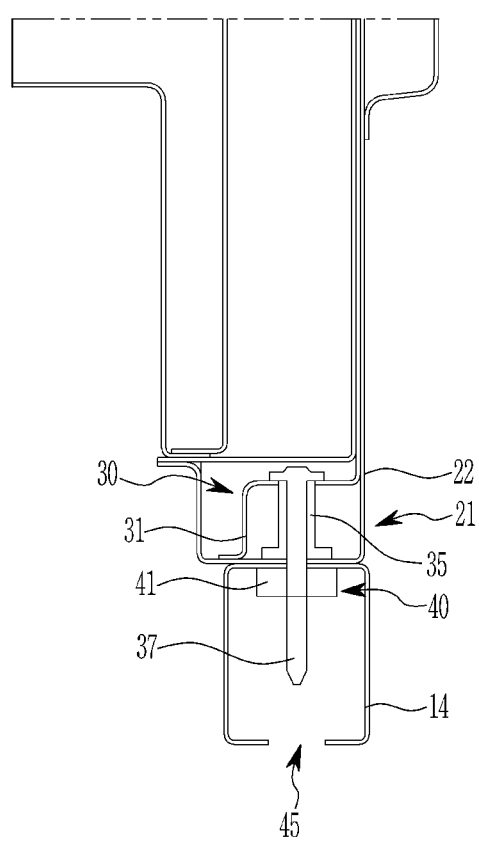
FIG. 4 is a joint cross-section schematic diagram showing a first mounting part and a first body coupling part applied to a vehicle body coupling structure according to an embodiment of the present invention.

FIG. 3 is an exploded perspective view showing a first mounting part and a first body coupling part applied to a vehicle body coupling structure according to an embodiment of the present invention, and FIG. 4 is a joint cross-section schematic diagram showing a first mounting part and a first body coupling part applied to a vehicle body coupling structure according to an embodiment of the present invention.

Referring to FIG. 3 and FIG. 4, the first mounting part 30 according to an embodiment of the present invention includes a first mounting bracket 31, a first bolt guide 35, and a first mounting bolt 37.

The first mounting bracket 31 is coupled to the front part 22 of the front side member 21. The first bolt guide 35 has a pipe shape of a circular cross-section and is coupled to the first mounting bracket 31. And, the first mounting bolt 37 is coupled to the first bolt guide 35.

The first body coupling part 40 according to an embodiment of the present invention includes a mounting nut 41 provided at the front crash box 14 of the front back beam assembly 11. The mounting nut 41 is engaged with the first mounting bolt 37 inserted through the upper surface into the interior of the front crash box 14.

Here, a first bolt joint hole 43 into which the first mounting bolt 37 is fitted is formed on the upper surface of the front crash box 14. Also, the mounting nut 41 is engaged with the first mounting bolt 37 through the mount hole 45 provided in the lower surface of the front crash box 14.

On the other hand, referring to FIG. 1 and FIG. 2, the vehicle body coupling structure 100 according to an embodiment of the present invention further includes a second mounting part 50 and a second body coupling part 60.

In an embodiment of the present invention, the second mounting part 50 is coupled with the front part 16a of the front chassis frame 13, and is provided on the center part 24 of the front side member 21.

Also, in an embodiment of the present invention, the second body coupling part 60 is engaged with the second mounting part 50, and is provided on the front part 16a of the front chassis frame 13.

The specific configuration of the second mounting part 50 and the second body coupling part 60 is described in detail below.

Figure 5:
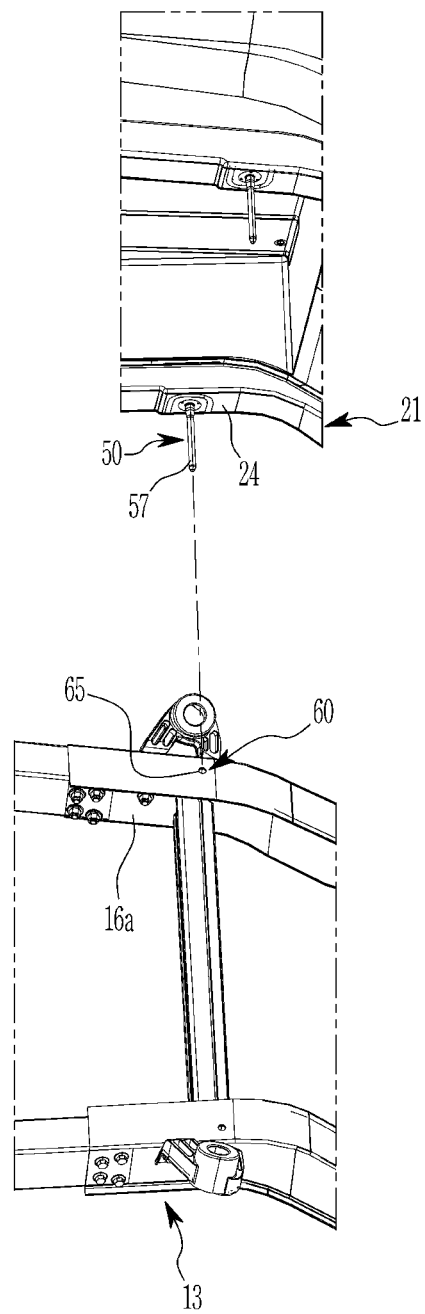
FIG. 5 is an exploded perspective view showing a second mounting part and a second body coupling part applied to a vehicle body coupling structure according to an embodiment of the present invention.
Figure 6:
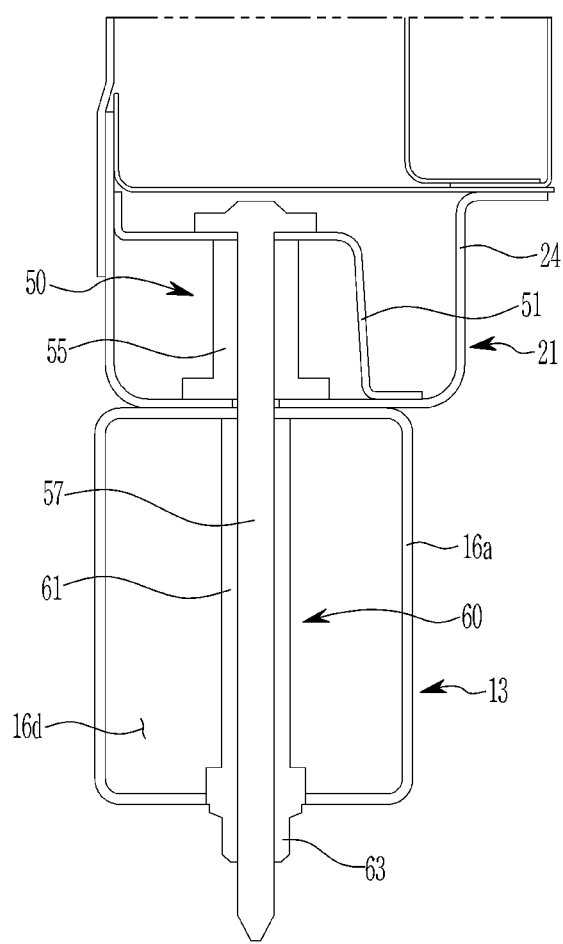
FIG. 6 is a joint cross-section schematic diagram showing a second mounting part and a second body coupling part applied to a vehicle body coupling structure according to an embodiment of the present invention.

FIG. 5 is an exploded perspective view showing a second mounting part and a second body coupling part applied to a vehicle body coupling structure according to an embodiment of the present invention, and FIG. 6 is a joint cross-section schematic diagram showing a second mounting part and a second body coupling part applied to a vehicle body coupling structure according to an embodiment of the present invention.

Referring to FIG. 5 and FIG. 6, the second mounting part 50 according to an embodiment of the present invention includes a second mounting bracket 51, a second bolt guide 55, and a second mounting bolt 57.

The second mounting bracket 51 is coupled to the center part 24 of the front side member 21. The second bolt guide 55 has a circular cross-section pipe shape and is coupled to the second mounting bracket 51. Also, the second mounting bolt 57 is coupled to the second bolt guide 55.

The second body coupling part 60 according to an embodiment of the present invention includes a third bolt guide 61 and a weld nut 63, which are provided on the front part 16a of the front chassis frame 13.

The third bolt guide 61 is a circular cross-section pipe shape and fixed within the front part 16a of the front chassis frame 13 with a closed cross-section 16d of the square shape. The third bolt guide 61 is where the second mounting bolt 57 is inserted, and supports the second mounting bolt 57 inserted inside the front part 16a of the front chassis frame 13 through the upper surface.

Here, a second bolt joint hole 65 is formed on the upper surface of the front part 16a of the front chassis frame 13 to allow the second mounting bolt 57 to be fitted into the third bolt guide 61.

The weld nut 63 is fixed to the underside of the front part 16a of the front chassis frame 13. The weld nut 63 is engaged with the second mounting bolt 57 passing through the third bolt guide 61 and the under surface of the front part 16a of the front chassis frame 13.

As described above, the second body coupling part 60 engaged with the second mounting part 50 forms a greater joint strength than the joint strength of the first body coupling part 40 engaged with the first mounting part 30 mentioned above.

The reason is that the first mounting part 30 is engaged with the front back beam assembly 11 made of an aluminum material, and the second mounting part 50 is engaged with the front chassis frame 13 made of a steel material. In addition, the second mounting bolt 57 penetrates to the lower surface of the third bolt guide 61 and the front chassis frame 13 to be engaged.

On the other hand, referring to FIG. 1 and FIG. 2, the vehicle body coupling structure 100 according to an embodiment of the present invention further includes a third mounting part 70 and a third body coupling part 80.

In an embodiment of the present invention, the third mounting part 70 is coupled with the center part 16b of the front chassis frame 13, and is provided on the rear part 26 of the front side member 21.

And, in an embodiment of the present invention, the third body coupling part 80 is engaged with the third mounting part 70, and is provided on the center part 16b of the front chassis frame 13.

The specific configuration of the third mounting part 70 and the third body coupling part 80 is described in detail below.

Figure 7:
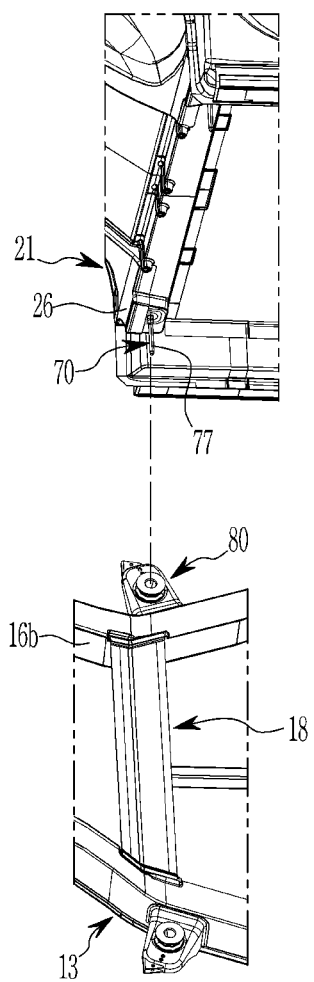
FIG. 7 is an exploded perspective view showing a third mounting part and a third body coupling part applied to a vehicle body coupling structure according to an embodiment of the present invention.
Figure 8:
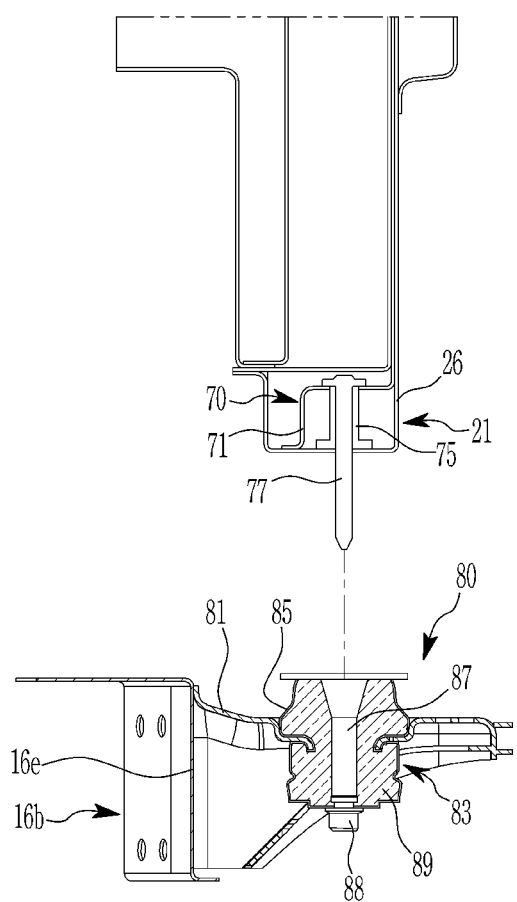
FIG. 8 is a joint cross-section schematic diagram showing a third mounting part and a third body coupling part applied to a vehicle body coupling structure according to an embodiment of the present invention.

FIG. 7 is an exploded perspective view showing a third mounting part and a third body coupling part applied to a vehicle body coupling structure according to an embodiment of the present invention, and FIG. 8 is a joint cross-section schematic diagram showing a third mounting part and a third body coupling part applied to a vehicle body coupling structure according to an embodiment of the present invention.

Referring to FIG. 7 and FIG. 8, the third mounting part 70 according to an embodiment of the present invention includes a third mounting bracket 71, a fourth bolt guide 75, and a third mounting bolt 77.

The third mounting bracket 71 is coupled to the rear part 26 of the front side member 21. The fourth bolt guide 75 has a circular cross-section pipe shape and is coupled to the third mounting bracket 71. Also, the third mounting bolt 77 is coupled to the fourth bolt guide 75.

The third body coupling part 80 according to an embodiment of the present invention includes a fixing bracket 81 and a mounting bush 83 provided on the center part 16b of the front chassis frame 13.

The fixing bracket 81 is coupled to be fixed to the outer surface 16e in the center part 16b of the front chassis frame 13. The mounting bush 83 is fixed to the fixing bracket 81 and engaged with the third mounting bolt 77.

Here, the mounting bush 83 includes an outer case 85, an inner pipe 87 provided inside the outer case 85, and a rubber bush 89 bonded between the outer case 85 and the inner pipe 87.

In the above, the inner pipe 87 is the part where the third mounting bolt 77 is fitted, and the weld nut 88 is coupled at the bottom. Accordingly, the third mounting bolt 77 may be fitted into the inner pipe 87 and may be engaged with the weld nut 88.

In this way, in the underbody 10 where the third mounting part 70 is coupled through the third body coupling part 80, the under crossmember 18 as above-described is coupled to the center part 16b of the front chassis frame 13 along the vehicle width direction.

Figure 9:
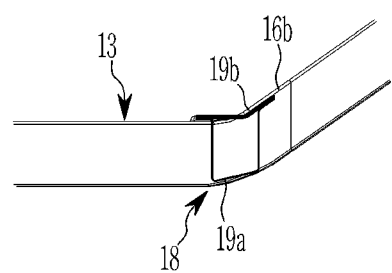
FIG. 9 is a cross-section schematic diagram showing an under crossmember of an underbody applied to a vehicle body coupling structure according to an embodiment of the present invention.

The above-mentioned under crossmember 18, as shown in FIG. 9, includes a lower part 19a connected to the center part 16b of the front chassis frame 13 along the vehicle width direction and an upper part 19b coupled to the upper surface of the center part 16b and the lower part 19a.

The lower part 19a is provided in the "r" form in which the upper end is opened. The upper part 19b is joined to the upper end of the lower part 19a, and is joined to the upper surface of the center part 16b through both ends.

On the other hand, referring to FIG. 1 and FIG. 2, the vehicle body coupling structure 100 according to an embodiment of the present invention further includes a fourth mounting part 90 and a fourth body coupling part 95.

In an embodiment of the present invention, the fourth mounting part 90 is coupled with the rear chassis frame 17 of the underbody 10, and is provided on the rear side member 29 of the upper body 20 mentioned above.

And, in an embodiment of the present invention, the fourth body coupling part 95 is engaged with the fourth mounting part 90, and is provided on the outer surface of the rear chassis frame 17.

The configuration of the fourth mounting part 90 and the fourth body coupling part 95 as described above is the same as the configuration of the third mounting part 70 and the third body coupling part 80 as described above. Accordingly, a more detailed description of the fourth mounting part 90 and the fourth body coupling part 95 described above in this specification is omitted.

Hereinafter, the effects of the vehicle body coupling structure 100 according to an embodiment of the present invention configured as described above is described in detail with reference to the accompanying drawings disclosed above.

First, in an embodiment of the present invention, the front part 22 of the front side member 21 of the upper body 20 is engaged with the front back beam assembly 11 of the underbody 10 through the first mounting part 30.

Here, the first mounting part 30 is engaged with the first body coupling part 40 provided in the front crash box 14 of the front back beam assembly 11. In this case, as the front back beam 12 and the front crash box 14 of the front back beam assembly 11 are made of an aluminum material, the first joint section of the first mounting part 30 and the first body coupling part 40 are formed as a weak body section.

And, in an embodiment of the present invention, the center part 24 of the front side member 21 is engaged with the front part 16a of the front chassis frame 13 positioned on the front back beam assembly 11 at the rear side through the second mounting part 50.

In the above, the second mounting part 50 is engaged with the second body coupling part 60 provided in the front part 16a of the front chassis frame 13. In this case, the second joint section of the second mounting part 50 and the second body coupling part 60 are formed as a rigid body section with the greater joint strength than the first joint section.

In addition, in an embodiment of the present invention, the rear part 26 of the front side member 21 is engaged with the center part 16b of the front chassis frame 13 through the third mounting part 70.

Here, the third mounting part 70 is engaged with the third body coupling part 80 provided in the center part 16b of the front chassis frame 13. In this case, the third joint section of the third mounting part 70 and the third body coupling part 80 are formed of the rigid body section connected to the second joint section.

Furthermore, in an embodiment of the present invention, the rear side member 29 of the upper body 20 is engaged with the rear chassis frame 17 of the underbody 10 through the fourth mounting part 90.

In the above, the fourth mounting part 90 is engaged with the fourth body coupling part 95 provided on the outer surface of the rear chassis frame 17. In this case, the fourth joint section of the fourth mounting part 90 and the fourth body coupling part 95 are formed of the rigid body section connected to the third joint section.

Therefore, in an embodiment of the present invention, when the vehicle is in a forward collision, such as a front, offset, and small overlap collision, the vehicle body deformation occurs first in the weakened section of the first joint section, and the vehicle body deformation is minimized in the rigid body section of the second, third, and fourth joint sections.

Accordingly, in an embodiment of the present invention, the collision load due to the frontal collision of the vehicle is absorbed in the first joint section, and the collision load is transmitted and distributed to the second, third, and fourth joint sections, thereby improving the forward collision performance of the vehicle.

In addition, in an embodiment of the present invention, it is possible to improve the overall joint strength and skeletal strength of the underbody 10 and the upper body 20 through the first, second, third, and fourth joint sections.

Furthermore, in an embodiment of the present invention, as the under crossmember 18 in the third joint section is composed of the lower part 19a and the upper part 19b, when the vehicle is in the frontal collision, it may prevent the battery assembly from being damaged by the drive motor's impact due to the deformation of the vehicle body.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A vehicle body coupling structure of a vehicle that includes an underbody and an upper body coupled to the underbody, the vehicle body coupling structure comprising:
   a front back beam assembly provided on a front side of the underbody;
   a first mounting part provided on a front side member of the upper body and coupled with the front back beam assembly; and
   a first body coupling part provided on the front back beam assembly and engaged with the first mounting part;
   wherein the front back beam assembly comprises a front back beam and a front crash box having the first body coupling part, the front crash box being connected to the front back beam;
   wherein the first mounting part comprises a first mounting bracket coupled to a front part of the front side member, a first bolt guide coupled to the first mounting bracket, and a first mounting bolt coupled to the first bolt guide; and
   wherein the first body coupling part comprises a mounting nut engaged with the first mounting bolt inserted inside the front crash box through an upper surface.

2. The vehicle body coupling structure of claim 1, wherein the front back beam and the front crash box comprise an aluminum material.

3. The vehicle body coupling structure of claim 1, wherein the mounting nut is engaged with the first mounting bolt through a mount hole provided on a lower surface of the front crash box.

4. The vehicle body coupling structure of claim 1, wherein:

the upper body comprises two side sills on opposite sides of the vehicle;

the front side member is connected to an upper crossmember in a vehicle width direction; and the upper crossmember is connected to the two side sills of the upper body.

5. A vehicle body coupling structure of a vehicle including an underbody and an upper body coupled to the underbody, the vehicle body coupling structure comprising:

a front back beam assembly provided on a front side of the underbody;

a first mounting part provided on a front side member of the upper body and coupled with the front back beam assembly; and a first body coupling part provided on the front back beam assembly and engaged with the first mounting part;

a front chassis frame connected to a rear of the front back beam assembly;

a second mounting part provided on a center part of the front side member and coupled with a front part of the front chassis frame, wherein the second mounting part comprises a second mounting bracket coupled to the center part of the front side member, a second bolt guide coupled to the second mounting bracket, and a second mounting bolt coupled to the second bolt guide; and a second body coupling part provided on the front part of the front chassis frame and engaged with the second mounting part, wherein the second body coupling part comprises a third bolt guide of a pipe shape fixed within a closed cross-section of the front chassis frame and configured to support the second mounting bolt inserted inside the front chassis frame through an upper surface and also comprises a weld nut fixed to a lower surface of the front chassis frame and engaged with the second mounting bolt penetrating the third bolt guide and the lower surface of the front chassis frame.

6. The vehicle body coupling structure of claim 5, wherein the second body coupling part has a greater joint strength than a joint strength of the first body coupling part.

7. The vehicle body coupling structure of claim 5, wherein the first mounting part comprises:

a first mounting bracket coupled to a front part of the front side member;

a first bolt guide coupled to the first mounting bracket; and a first mounting bolt coupled to the first bolt guide.

8. The vehicle body coupling structure of claim 5, further comprising:

a third mounting part provided on a rear part of the front side member and coupled to a center part of the front chassis frame; and a third body coupling part provided on the center part of the front chassis frame and engaged with the third mounting part.

9. The vehicle body coupling structure of claim 8, wherein the third mounting part comprises:

a third mounting bracket coupled to the rear part of the front side member;

a fourth bolt guide coupled to the third mounting bracket; and a third mounting bolt coupled to the fourth bolt guide.

10. The vehicle body coupling structure of claim 9, wherein the third body coupling part comprises:

a fixing bracket coupled to an outer surface of the front chassis frame; and a mounting bush fixed to the fixing bracket and engaged with the third mounting bolt.

11. The vehicle body coupling structure of claim 8, further comprising an under crossmember provided on the center part of the front chassis frame and coupled along a vehicle width direction.

12. The vehicle body coupling structure of claim 11, wherein the under crossmember comprises:

a lower part connected to the center part of the front chassis frame along the vehicle width direction; and an upper part coupled with an upper surface of the front chassis frame and the lower part.

13. The vehicle body coupling structure of claim 8, further comprising:

a center chassis frame connected to a rear of the front chassis frame;

a rear chassis frame connected to a rear of the center chassis frame;

a fourth mounting part provided on a rear side member of the upper body and coupled with the rear chassis frame; and a fourth body coupling part provided on the rear chassis frame and engaged with the fourth mounting part.

14. A vehicle body comprising:

an underbody;

an upper body coupled to the underbody and having a front side member;

a front back beam assembly provided on a front side of the underbody;

a first mounting part provided on the front side member and coupled with the front back beam assembly;

a first body coupling part provided on the front back beam assembly and engaged with the first mounting part;

a front chassis frame connected to a rear of the front back beam assembly;

a second mounting part provided on a center part of the front side member and coupled with a front part of the front chassis frame, wherein the second mounting part comprises a second mounting bracket coupled to the center part of the front side member, a second bolt guide coupled to the second mounting bracket, and a second mounting bolt coupled to the second bolt guide;

a second body coupling part provided on the front part of the front chassis frame and engaged with the second mounting part, wherein the second body coupling part comprises a third bolt guide of a pipe shape fixed within a closed cross-section of the front chassis frame and configured to support the second mounting bolt inserted inside the front chassis frame through an upper surface and also comprises a weld nut fixed to a lower surface of the front chassis frame and engaged with the second mounting bolt penetrating the third bolt guide and the lower surface of the front chassis frame;

a third mounting part provided on a rear part of the front side member and coupled to a center part of the front chassis frame; and a third body coupling part provided on the center part of the front chassis frame and engaged with the third mounting part.

15. The vehicle body of claim 14, further comprising:

two side sills on opposite sides of the vehicle body; and an upper crossmember connected to the two side sills, wherein the front side member is connected to the upper crossmember in a vehicle width direction.

16. The vehicle body of claim 14, wherein the third mounting part comprises:

a third mounting bracket coupled to the rear part of the front side member;

a fourth bolt guide coupled to the third mounting bracket; and a third mounting bolt coupled to the fourth bolt guide.

17. The vehicle body of claim 16, wherein the third body coupling part comprises:

a fixing bracket coupled to an outer surface of the front chassis frame; and a mounting bush fixed to the fixing bracket and engaged with the third mounting bolt.

18. The vehicle body of claim 14, further comprising an under crossmember provided on the center part of the front chassis frame and coupled along a vehicle width direction.

19. The vehicle body of claim 18, wherein the under crossmember comprises:

a lower part connected to the center part of the front chassis frame along the vehicle width direction; and an upper part coupled with an upper surface of the front chassis frame and the lower part.

20. The vehicle body of claim 14, further comprising:

a center chassis frame connected to a rear of the front chassis frame;

a rear chassis frame connected to a rear of the center chassis frame;

a fourth mounting part provided on a rear side member of the upper body and coupled with the rear chassis frame; and a fourth body coupling part provided on the rear chassis frame and engaged with the fourth mounting part.

* * * * *